Patented May 18, 1943

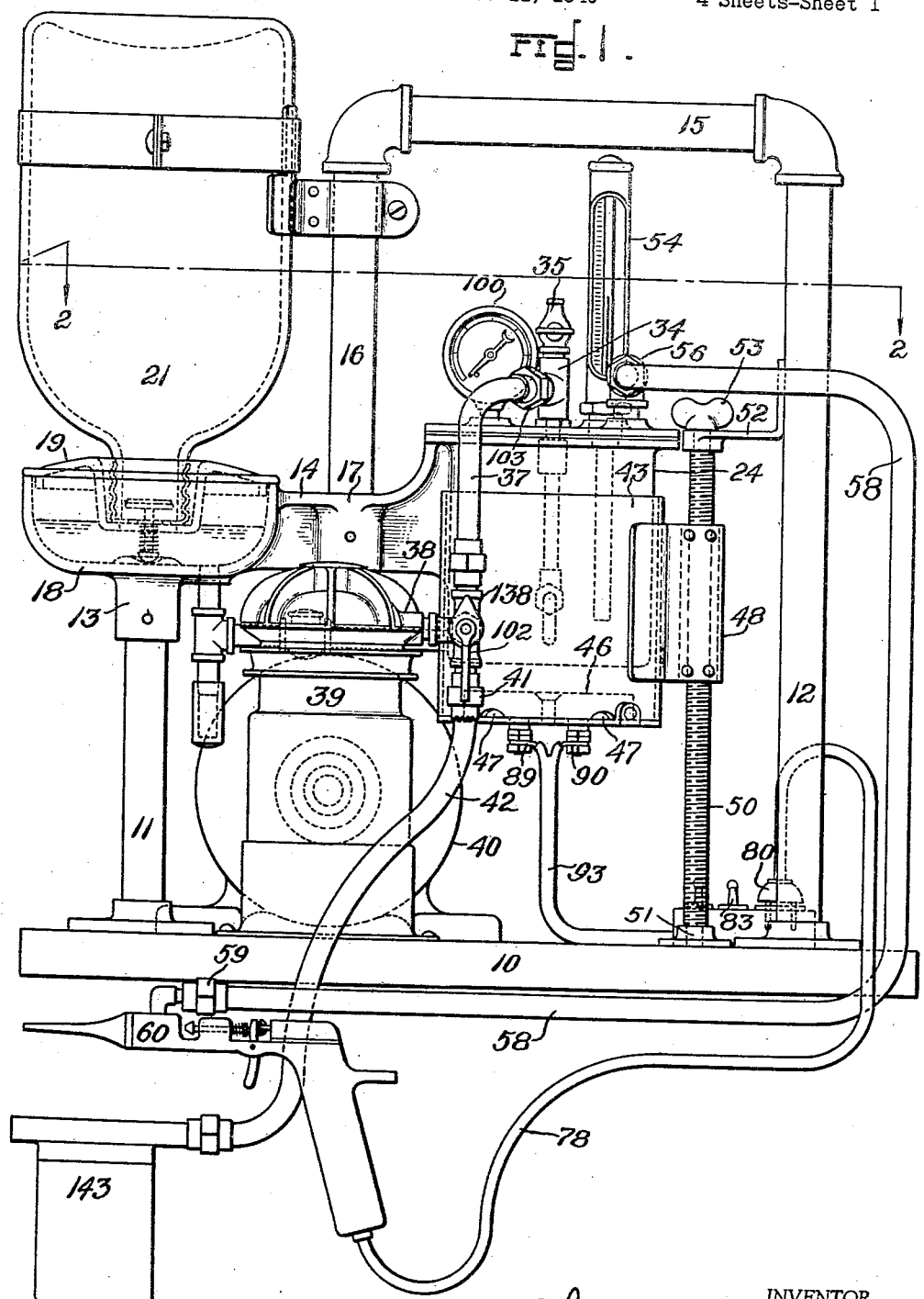

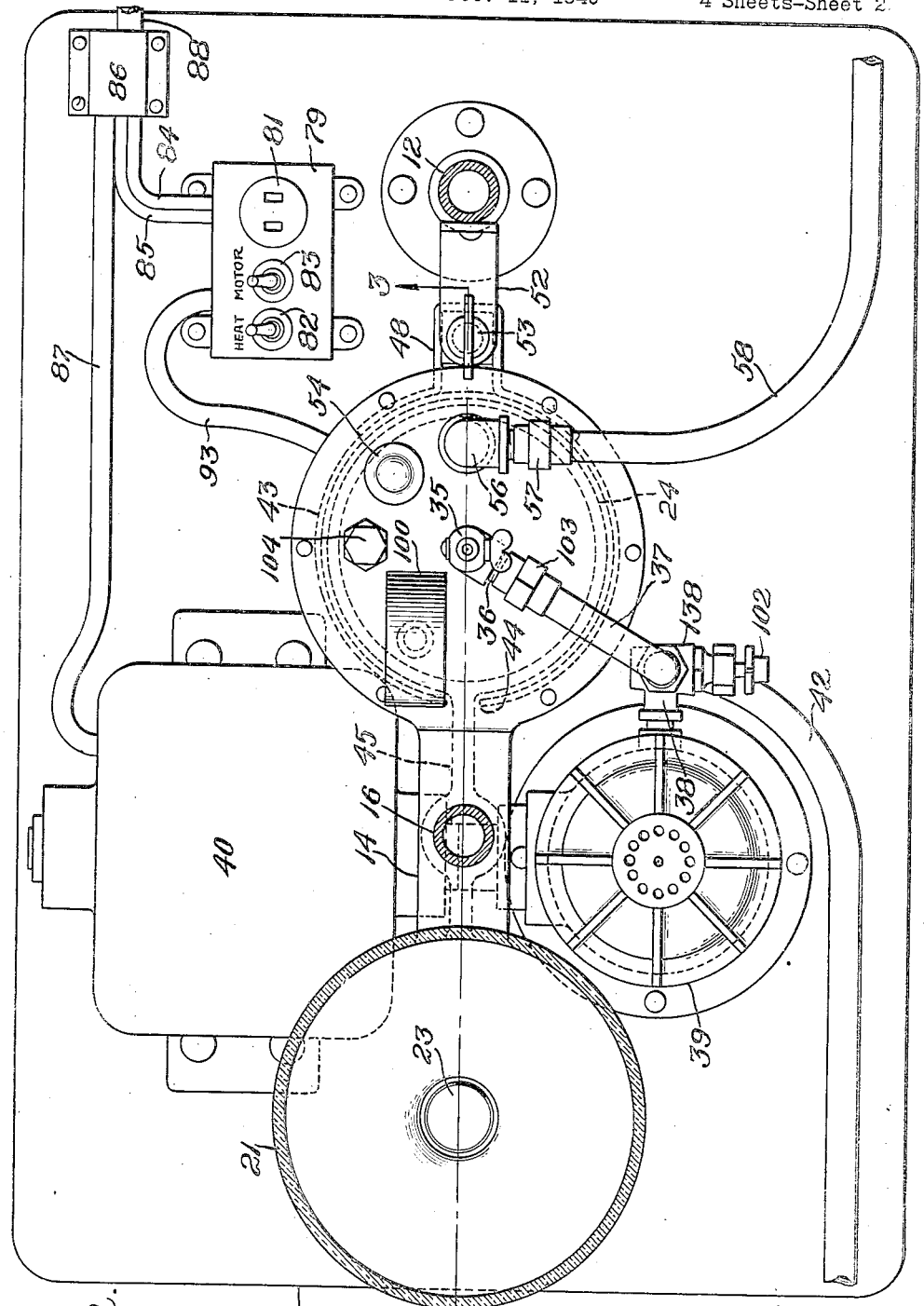

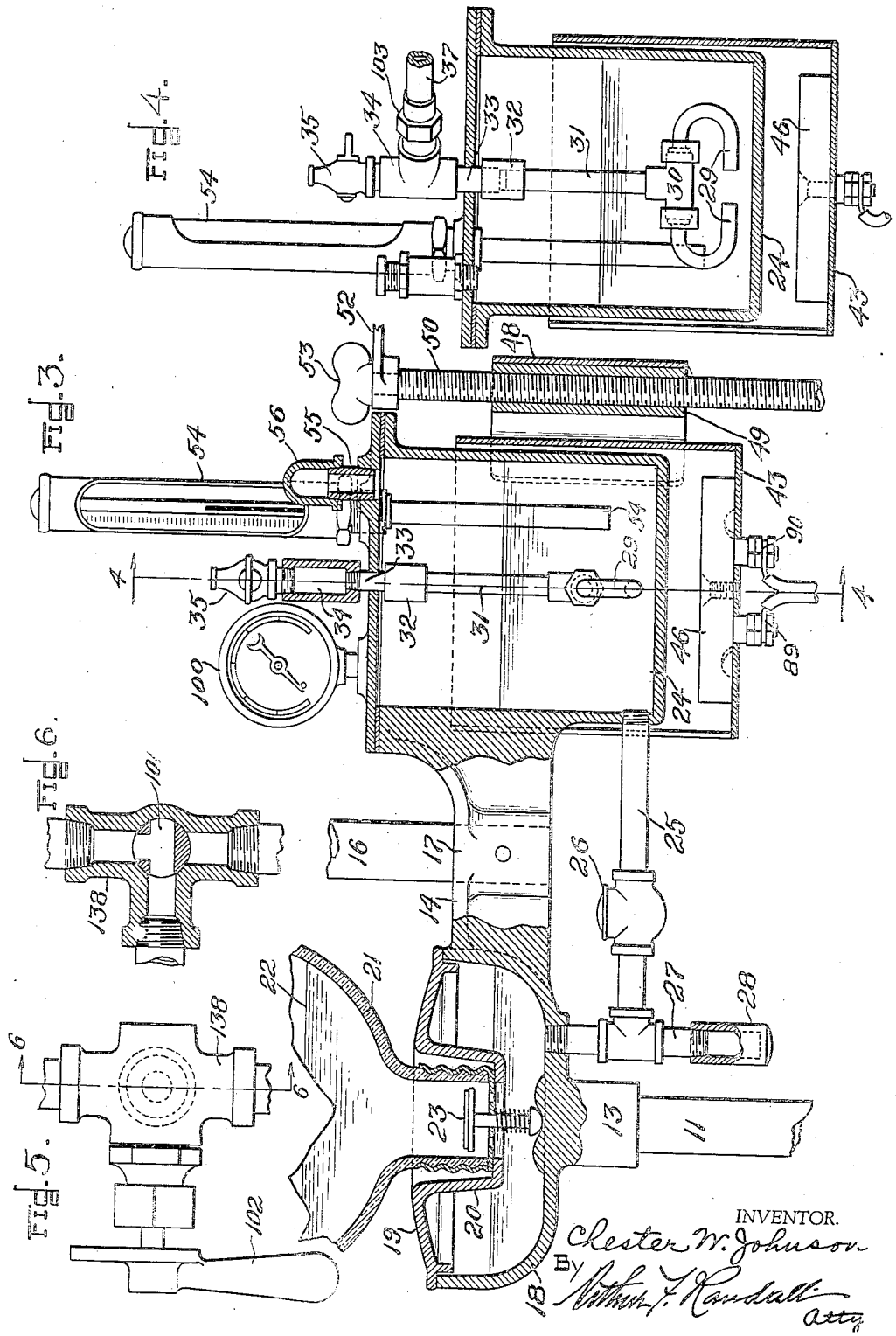

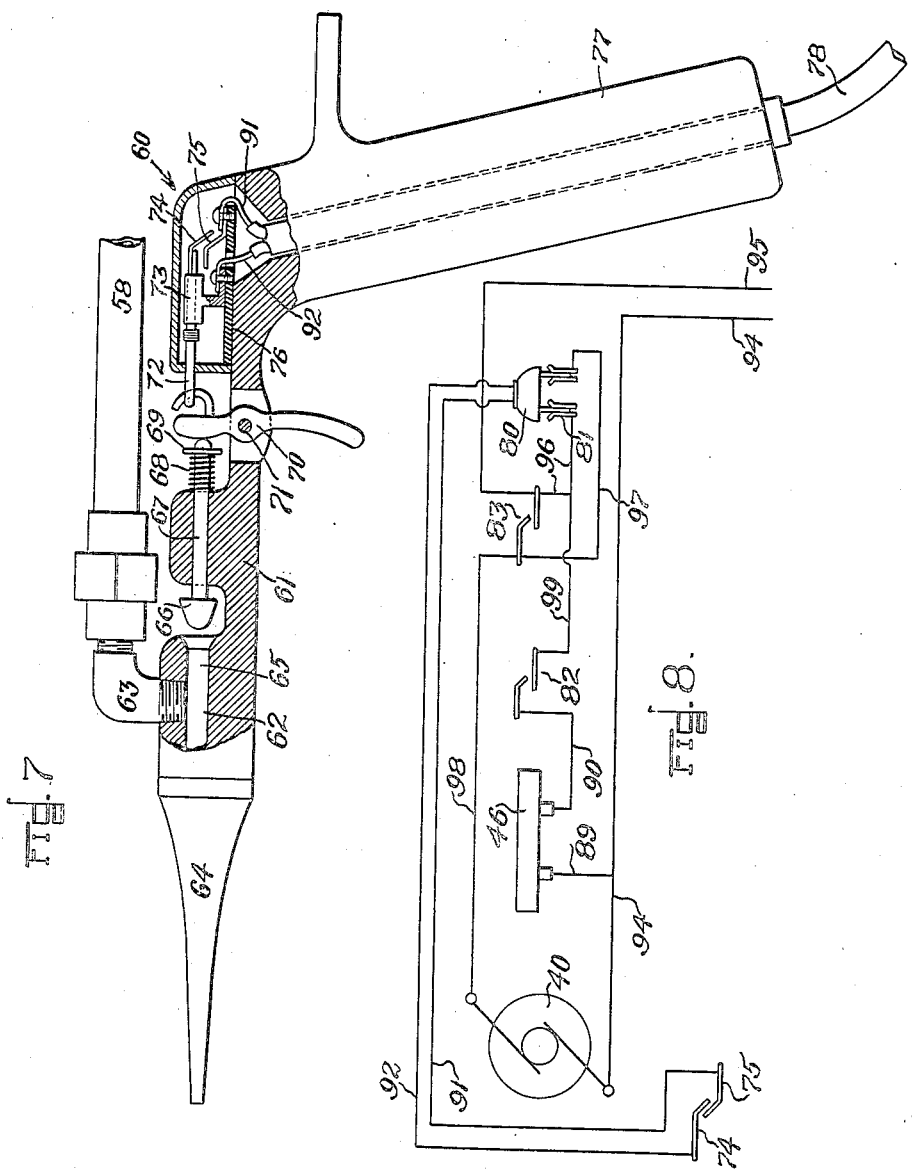

2,319,459

UNITED STATES PATENT OFFICE 2,319,459

APPARATUS FOR VAPORIZING AND APPLYING LIQUIDS

Chester W. Johnson, Boston, Mass., assignor of one-half to Willard MacMillan, Watertown, Mass.

Application December 11, 1940, Serial No. 369,604

10 Claims. (Cl. 299—83)

This invention relates to apparatus for use in spraying liquids and it has for its object to provide an inexpensive and efficient apparatus of this class.

More particularly the invention contemplates the provision of a manually controlled, self-contained, portable apparatus which may be operated to deliver a jet of vaporized liquid as and when desired.

To these ends I have provided an apparatus of the character described which, in its preferred form, is constructed and operates as set forth in the following description, the several novel features of the invention being separately pointed out and defined in the claims at the close of the description.

In the accompanying drawings:

Figure 1 is a side elevation of a spraying apparatus constructed in accordance with this invention.

Figure 2 is a section on line 2—2 of Fig. 1.

Figure 3 is a partial section on line 3—3 of Fig. 2.

Figure 4 is a section on line 4—4 of Fig. 2.

Figure 5 is a detail of the three-way valve hereinafter described.

Figure 6 is a section on line 6—6 of Fig. 5.

Figure 7 is an elevation, partly in section, of the spray-gun hereinafter described.

Figure 8 is a diagrammatic view illustrating the electrical circuits embodied in the apparatus illustrated in Figs. 1 and 2.

The illustrated embodiment of my invention is particularly designed for use in vaporizing and applying the fumes of a liquid chemical under pressure to surfaces from which it is desired to remove shellac, varnish, lacquer, paint, wax and the like, and by its use it is possible to accomplish this purpose expeditiously, efficiently and economically. The illustrated embodiment can also be utilized to vaporize and distribute under pressure the fumes of a liquid for killing insects, rats and other vermin. Of course an appropriate liquid chemical, or blend of chemicals, is employed with the apparatus according to the purpose served by the latter.

The apparatus shown in the drawings comprises a base 10 provided upon its top side with two upstanding posts 11 and 12 which are fastened at their lower ends to said base. The upper end of post 11 is fixed in position within a socket 13 provided upon the underside of a bracket 14 adjacent to one end thereof. The other post 12 is made at its top with a laterally extending arm 15 which serves as a handle by means of which the apparatus is moved about and transported. A downwardly projecting extension 16 of arm 15 has its lower end fastened within a socket 17 forming part of bracket 14. Base 10, post 11, bracket 14 and post 12—15—16 constitute the frame of the apparatus.

One end of bracket 14 is made with a vessel 18 that is provided with a removable lid or top wall 19 made at its middle with a well or pocket 20, Fig. 3, within which is seated the neck of an inverted bottle reservoir 21 holding a supply of liquid chemical 22.

The neck of bottle 21 is provided with a cap formed with outlet openings which are closed by a spring-pressed valve 23 while the bottle is being placed in position or being removed, as is usual with reservoirs of this type. Also, as usual, when the neck of the bottle is placed within the well 20 the valve 23 is supported in open position through the engagement of its stem with the bottom of the vessel 18 so that the liquid will be discharged by gravity from bottle 21 into vessel 18 until the outlet ports of the bottle cap are closed by the liquid within vessel 18, whereupon delivery of liquid into the latter ceases. Thus the construction described provides for barometric control of the delivery of liquid from reservoir bottle 21 into trap vessel 18 whereby the body of liquid within the latter is automatically maintained at a predetermined height.

The inner end of bracket 14 is made with a cylindrical vaporizing chamber 24 that is closed at its top and bottom ends by end walls. Adjacent to its bottom wall chamber 24 is provided with an inlet port connected by a pipe conduit 25 with an outlet port provided at the bottom of trap vessel 18. In this conduit is arranged a check valve 26 which closes toward trap vessel 18.

A branch pipe or nipple 27 is connected with conduit 25 at a point between valve 26 and vessel 18 and the lower end of this branch is threaded to receive upon it the upper interiorly threaded end of a removable cup 28 normally closing said end and providing a chamber for the reception of sediment carried into conduit 25 by the liquid as it flows from the trap vessel 18.

As will be clear from Fig. 3 the liquid chemical is free to flow by gravity from trap 18 through conduit 25 into vaporizing chamber 24 so that a body of said liquid is maintained within said chamber at the same level as that within vessel 18 when atmospheric pressure exists in both vessel 18 and chamber 24. This level, however, is a substantial distance below the top wall of the vaporizing chamber thereby providing a storage space for fumes or vapors.

Within the vaporizing chamber 24, Fig. 4, is arranged a pair of opposed nozzles 29 both of which are connected by a T 30 with the lower end of a pipe section 31 whose upper end is connected by a union 32 with a nipple 33. This nipple extends upwardly through the top wall of chamber 24 and has its upper end screwed into one branch of a T 34. Another branch of this T is equipped with a pet-cock 35, while the third branch is provided with a threaded nipple 36, Fig. 2.

The nipple 36 is connected by a flexible conduit 37 with one of the outlets of a three-way valve 138, Figs. 1, 2, 5 and 6, the inlet of said valve being connected by a nipple with the outlet 38 of an air pump 39 of usual construction. The other outlet of valve 138 is separably connected by a coupling 41 with one end of a flexible conduit 42 whose opposite end may be equipped with an atomizer 143 adapted to hold paint or the like.

Pump 39 is fastened in position upon the top of base 10 and is driven by an electric motor 40 also fastened in position upon the top of said base.

A cylindrical sheet metal jacket or sheath 43, Figs. 2 and 3, surrounds vaporizing chamber 24, said jacket being made with a longitudinal slot 44 which is occupied by the web 45 of bracket 14. This jacket is provided with a bottom wall and incloses an electric heating unit 46 which is fixed in position upon said bottom wall. Air inlet ports 47 are formed in jacket 43 adjacent to the lower end thereof while the slot 44 also serves as an air inlet port.

Jacket 43 is made with an arm 48, Fig. 3, within which is fixedly mounted a metal block 49 provided with a vertical threaded hole whose threads mesh with the threads of a vertically disposed screw 50 that is parallel with the axis of chamber 24. At its lower end the screw 50 is rotatably mounted within a socket 51 on base 10, while the upper end of said screw is rotatably supported within a bearing provided by an arm 52 projecting from post 12. At its upper extremity the screw 50 is provided with a handle 53 by means of which it is manually rotated to adjust jacket 43 vertically relatively to the vaporizing chamber 24.

When jacket 43 is thus adjusted, the heater 46 is moved toward or from the bottom of chamber 24 and at the same time the capacity of the ventilating slot 44 is varied. In this way the temperature of the contents of chamber 24 is manually regulated according to the character of the liquid being used and as required during the operation of the apparatus. With this in view a thermometer 54 is mounted within an aperture provided in the top wall of chamber 24, said thermometer extending downwardly into the liquid contents of the latter so that the operator is at all times informed as to the temperature of said contents and is guided accordingly in his adjustment of the screw 50.

During the operation of the apparatus the liquid within chamber 24 is depleted but the trap 18 automatically replenishes the same through the pipe 25 and maintains the level of the liquid a predetermined distance below the top wall of the chamber thereby providing a space above said level for the fumes or vapors created by the heat from unit 46. At the top of this space is provided an outlet connected by a nipple 55, elbow 56 and coupling 57 with one end of a flexible delivery conduit 58. This conduit is of substantial length and at its opposite end is connected by a coupling 59 with the inlet of a gun terminal 60.

As shown in Fig. 7 the gun terminal 60 comprises a body 61 formed with a port 62 connecting the inlet 63 with a distributing nozzle 64. The port 62 is made with a rearwardly extending branch or extension 65 formed at its rear end with a seat for a normally open valve 66, said valve being made with a rearwardly extending stem 67 slidably mounted in a bearing provided in body 61. A coiled spring 68 mounted on stem 67 bears at its one end against body 61 and at its opposite end against a collar 69 fast on said stem and serves to yieldingly urge the latter rearwardly against one arm of a finger lever 70 pivotally mounted at 71 within a slot formed in body 61.

The upper arm of lever 70 has pivotally connected to it one end of a slide 72 that is slidably mounted within a metal bracket 73 rigidly fixed in position upon a block of insulating material 76 which, in turn, is fixed in position upon body 61. At its rear end the slide 72 carries a spring contact 74 co-operating with a fixed spring contact 75 mounted on the block of insulating material 76.

At its rear end the body 61 is made with a tubular handle 77 through which extends a two-wire cable 78 whereof one wire, 91, is connected with fixed contact 75 and the other wire, 92, is connected through bracket 73 with contact 74. The cable 78 is of approximately the same length as the conduit 58 and extends from handle 77 to a switch box 79 fixed in position upon the top of base 10 and this end of the cable is equipped with a pronged plug 80, Figs. 1 and 2, occupying a socket 81 forming part of said switch box.

Box 79 is constructed with two manually operated make-and-break switches 82 and 83 in addition to socket 81 and from these three instruments conductor cables 84 and 85 lead to a junction box 86 into which also extends one end of a conductor cable 87 and one end of a main current supplying cable 88. The binding posts of heating unit 46 have connected to them the wires 89 and 90 of a two-wire cable 93 which also leads to switch box 79, Figs. 1 and 2.

The cable 87 is connected with the motor 40 and at times, sometimes continuously and sometimes intermittently, current is supplied to the motor through said cable as presently to be described. Also, when switch 82 is closed current is continuously supplied to the heating unit 46.

Figure 8 illustrates the electrical connections of the above described apparatus, 94 and 95 representing the two wires of the current-supplying cable 88. The wire 95 is connected with one of the contacts of the switch 83 which, in turn, is connected by a wire 96 with one pair of jaws of socket 81. The other pair of jaws of socket 81 is connected by a wire 97 with the other contact of switch 83 while the latter contact is connected by a wire 98 with one terminal of motor 40. To the other terminal of motor 40 is connected the main line wire 94.

One prong of the plug 80 is connected by wire 92 with contact 74 of the gun 60 while the other prong of said plug is connected by the wire 91 with the other contact 75 of the gun. The wire 89 connects its heater terminal with the main line wire 94 and the other terminal of the heater is connected by the wire 90 with one of the contacts of switch 82 whose other contact is connected by a wire 99 with the wire 96.

It will thus be seen that the circuit of motor 40 can be maintained continuously closed by adjusting switch 83 into its closed position, or if this switch is left open and plug 80 occupies its position within socket 81, as shown, then the motor circuit can be completed by closing the gun switch 74—75. It will also be clear that the circuit of heating unit 46 is completed when switch 82 is adjusted into its closed position.

The apparatus is prepared for operation in conjunction with gun 60, and to the exclusion of atomizer 143, by setting the valve element or plug of valve 138 in the position shown in Fig. 6 and closing the heater switch 82, switch 83 being left in its open condition. When thermometer 54 shows that a liquid vaporizing temperature exists in chamber 24 the apparatus is in condition for use. In using the apparatus finger pressure is exerted upon lever 70 to close gun switch 74—75 and outlet port 65 whereupon air pump 39 is started and air is delivered into chamber 24 adjacent to the bottom thereof through the nozzles 29. Since these nozzles are in close proximity and opposed the jets of air issuing therefrom strike against each other and the air is broken up so as to be scattered through the liquid contents of chamber 24 as it rises to the top of said contents.

The outlet 65 of gun 60 is of substantially greater capacity than the outlet provided by nozzle 64 and as a result a pressure of four or five pounds is quickly built up within chamber 24 which causes a continuous flow of vapors or fumes through conduit 58 and gun conduit 62 to the nozzle 64 from which it is forcibly discharged. The jet of vapor or fumes thus forcibly discharged from nozzle 64 is directed by the operator on to the surface to be treated, said jet consisting of a heated mixture of vaporized liquid and air. To stop the operation of the apparatus finger pressure is removed from the gun lever 70 which permits spring 68, acting through the connections described, to open port 65 and switch 74—75. The opening of switch 74—75 stops motor 40 and pump 39 while the opening of vent port 65 relieves the pressure within chamber 24 with the result that the supply of liquid within the latter is replenished by gravity through pipe 25, Fig. 3, from trap 18.

When it is desired to use the atomizer 143 the valve element or plug 101 of valve 138, Fig. 6, is rotatively adjusted manually to the extent of 180 degrees from the position shown which closes conduit 37 and establishes communication between the pump exhaust or outlet 38 and the conduit 42 leading to atomizer 143. Also switch 83 is caused to occupy its closed position so that motor 40 and pump 39 are continuously in operation supplying air under pressure to the atomizer. The stem of the valve element or plug 101 is provided with a handle 102 by means of which the valve is adjusted as described.

The conduit 58 is separably connected with elbow 56, Fig. 2, by the coupling 57, while the conduit 37 is separably connected with the nipple 36 by a coupling 103. This construction provides for disconnection of both conduits and reversal of their positions. That is, it permits conduit 58 to be connected with nipple 36 and conduit 37 with elbow 56. After such adjustment, and with switch 83 open and the valve element or plug 101 occupying the position shown in Fig. 6, the pump 39 will be operated each time finger pressure is applied to gun lever 70 and air under pressure will be delivered into chamber 24 through conduit 37 and elbow 56 on top of the liquid contents of the chamber. This results in liquid being forced out of chamber 24 through nozzles 29, pipe section 31 and conduit 58 to gun 60 where it is discharged from nozzle 64.

Thus the above described apparatus is constructed to provide for the delivery to gun 60 of either a pre-heated mixture of air and vapor or the like, or a liquid which may or may not be pre-heated.

In order to avoid the accumulation of excessive pressure within the chamber 24 the latter is provided at its top with a safety valve 104 which may be set or adjusted as required.

The pet-cock 35 can be utilized to control and regulate the pressure within chamber 24. When said pet-cock is adjusted into its fully closed position as shown in the drawings all of the air from pump 39 is delivered into chamber 24 so that maximum pressure will exist within the latter, but when set or adjusted so that it is more or less open some of the air from the pump will be diverted into the atmosphere through the pet-cock and lower pressure will exist within the chamber.

The finely divided state of the vapors discharged from nozzle 64, Fig. 7, and the force with which they are projected against the surface to be cleaned, causes the same to effectively penetrate the paint or the like that is to be removed so that not only is considerably less liquid required than heretofore to treat a given area of surface, but there is no apparent accumulation of surplus liquid on said surface such as has characterized the use of apparatus and methods heretofore resorted to. The use of my new method and apparatus effects the removal of the paint or the like most expeditiously, conveniently and economically.

What I claim is:

1. An apparatus of the character described comprising a vaporizing chamber having an air inlet port adjacent to its bottom and a vapor outlet port adjacent to its top; means for automatically maintaining a body of liquid within said chamber at a predetermined level below said vapor outlet port; means for heating said body of liquid to vaporize the same; means for supplying air under pressure to said chamber through said air inlet port; a flexible delivery conduit having one end thereof connected with said vapor outlet port, and a terminal at the opposite end of said conduit through which vapor from said conduit is directed on to the surface to be treated.

2. An apparatus of the character described comprising a vaporizing chamber having an air inlet port adjacent to its bottom and a vapor outlet port adjacent to its top; means for automatically maintaining a body of liquid within said chamber at a predetermined level below said vapor outlet port; means for heating said body of liquid to vaporize the same; means for supplying air under pressure to said chamber through said air inlet port; a flexible delivery conduit having one end thereof connected with said vapor outlet port; a terminal at the opposite end of said conduit through which vapor from said conduit is directed on to the surface to be treated, and means including a manually operated member adjustably mounted on said terminal by which the action of said air-supplying means is controlled.

3. An apparatus of the character described comprising a vaporizing chamber having an air inlet port adjacent to its bottom, a vapor-outlet port adjacent to its top and a liquid-inlet port; barometric liquid-feeding means including a delivery pipe connected with said liquid-inlet port and operative to automatically maintain a body of liquid within said chamber at a predetermined level below said vapor-outlet port, said liquid-feeding means including a check valve in said pipe which opens toward said chamber; means for heating said body of liquid to vaporize the same; means for supplying air under pressure to said chamber through said air inlet port; a flexible delivery conduit having one end thereof connected with said vapor outlet port; a gun terminal at the opposite end of said conduit through which vapor is directed from said conduit on to the surface to be treated, said terminal being provided with a delivery nozzle and also with a vent port communicating through said conduit with said chamber, and means for controlling said vent port and said air-supplying means including a member adjustably mounted on said terminal and manually operable to start said air-supplying means and close said vent and also manually operable to stop said air-supplying means and open said vent.

4. The combination of a vaporizing chamber for holding a body of liquid; a jacket closely surrounding said chamber; a chamber-heating element mounted within said jacket upon the bottom thereof and beneath said chamber, and means independently supporting said chamber and jacket with provision for adjustment thereof relatively thereby to regulate the effective heating action of said heating element.

5. The combination of claim 4 wherein said chamber is provided with an air inlet adjacent to the bottom thereof and with an outlet for vapors adjacent to the top thereof, and wherein there is also provided means for supplying air under pressure to said chamber through said air inlet, and a delivery conduit connected with said outlet.

6. The combination of claim 4 wherein said chamber is provided with an air inlet adjacent to the bottom thereof and with an outlet for vapors adjacent to the top thereof, and wherein there is also provided means for supplying air under pressure to said chamber through said air inlet; means for automatically maintaining a body of liquid within said chamber at a predetermined level below said outlet, and a delivery conduit connected with said outlet.

7. The combination of a stationarily supported cylindroidal vaporizing chamber for holding a body of liquid; a jacket closely surrounding said chamber; a chamber-heating element mounted within said jacket adjacent to the bottom thereof; a screw disposed adjacent to said jacket with its axis parallel with the axis of said chamber, said screw occupying a threaded aperture provided on said jacket and serving as a support for the latter, and means rotatably supporting said screw so that it is held against endwise movement, said screw being operable when rotated to move said jacket relatively to said chamber thereby to adjust said heating element toward and from the bottom of said chamber and regulate the effective heating action of said element.

8. A portable apparatus of the character described comprising a base; a vaporizing chamber fixedly mounted on said base and made with an air inlet adjacent to the bottom thereof and with an outlet for vapors adjacent to the top thereof; barometric liquid-feeding means for maintaining a body of liquid within said chamber at a predetermined level relatively to said vapor outlet; chamber heating means; a pump mounted on said base for supplying air under pressure to said chamber through said air inlet; an electric motor mounted on said base for driving said pump; a current-supplying circuit for said motor; a flexible delivery conduit having one end thereof connected with the vapor outlet of said chamber; a gun terminal connected with the opposite end of said conduit, and a switch mechanism mounted on said gun terminal and arranged in said circuit, said mechanism being adapted to be manually controlled to start and stop said motor.

9. An apparatus of the character described constructed in accordance with claim 8 and wherein said switch mechanism includes a finger-actuated member by means of which said switch mechanism is operated; wherein said terminal is made with a normally open vent port for said conduit, and wherein a valve is movably mounted on said terminal which is adjusted by said finger member to close said vent port when said member is operated to start said motor.

10. An apparatus of the character described constructed in accordance with claim 8 and wherein said chamber-heating means comprises a heater element and means for supporting said element adjacent to said chamber with provision for adjustment relatively thereto to regulate the effective heating action of said element.

CHESTER W. JOHNSON.